(12) United States Patent
Rutty

(10) Patent No.: US 8,745,916 B1
(45) Date of Patent: Jun. 10, 2014

(54) FISHING LURE

(76) Inventor: Ken Rutty, Port Neches, TX (US)

( * ) Notice: Subject to any disclaimer, the term of this patent is extended or adjusted under 35 U.S.C. 154(b) by 251 days.

(21) Appl. No.: 13/490,676

(22) Filed: Jun. 7, 2012

(51) Int. Cl.
*A01K 85/00* (2006.01)

(52) U.S. Cl.
USPC ....... 43/42.35; 43/42.06; 43/42.12; 43/42.28; 43/42.36

(58) Field of Classification Search
USPC .......... 244/42.35, 42.06, 42.12, 42.28, 42.36, 244/42.24
See application file for complete search history.

(56) References Cited

U.S. PATENT DOCUMENTS

| | | | |
|---|---|---|---|
| 3,269,050 A * | 8/1966 | Garwood | 43/42.33 |
| 4,133,134 A | 1/1979 | Cheng | |
| 4,516,350 A * | 5/1985 | Malphrus | 43/17.6 |
| 4,520,588 A * | 6/1985 | Hindermyer | 43/42.06 |
| 4,726,138 A | 2/1988 | Hurt | |
| 4,777,757 A | 10/1988 | de Marees van Swinderen | |
| 4,922,646 A * | 5/1990 | Basgal | 43/42.33 |
| 5,535,540 A * | 7/1996 | Crumrine | 43/42.09 |
| 6,675,525 B1 * | 1/2004 | Ford | 43/42.24 |
| 8,402,687 B1 * | 3/2013 | Jarrell | 43/42.28 |
| 2002/0050089 A1 | 5/2002 | Dixon | |
| 2003/0126785 A1 | 7/2003 | Poinski | |
| 2006/0260179 A1 * | 11/2006 | Guigo | 43/42.36 |
| 2008/0313948 A1 * | 12/2008 | Lewis | 43/42.24 |
| 2011/0214332 A1 * | 9/2011 | Partridge | 43/42.06 |

* cited by examiner

Primary Examiner — Christopher P Ellis

(57) ABSTRACT

A fishing lure includes an inner member and a sheath. The inner member is positioned in the sheath with a bottom wall of the inner member facing an open end of the sheath. A closed end of the sheath, a perimeter wall of the inner member and the bottom wall of the inner member define an interior space. Openings are provided in the bottom wall. A primary hook is inserted through the closed end of the sheath and the open end of the inner member. The hook extends through the perimeter wall and a peripheral wall of the sheath such that a point of the hook is positioned outside of the sheath. A weighted capsule is positioned in the interior space. A scent producing material is releases a scent through the openings in the bottom wall of the inner member and the open end of the sheath.

11 Claims, 3 Drawing Sheets

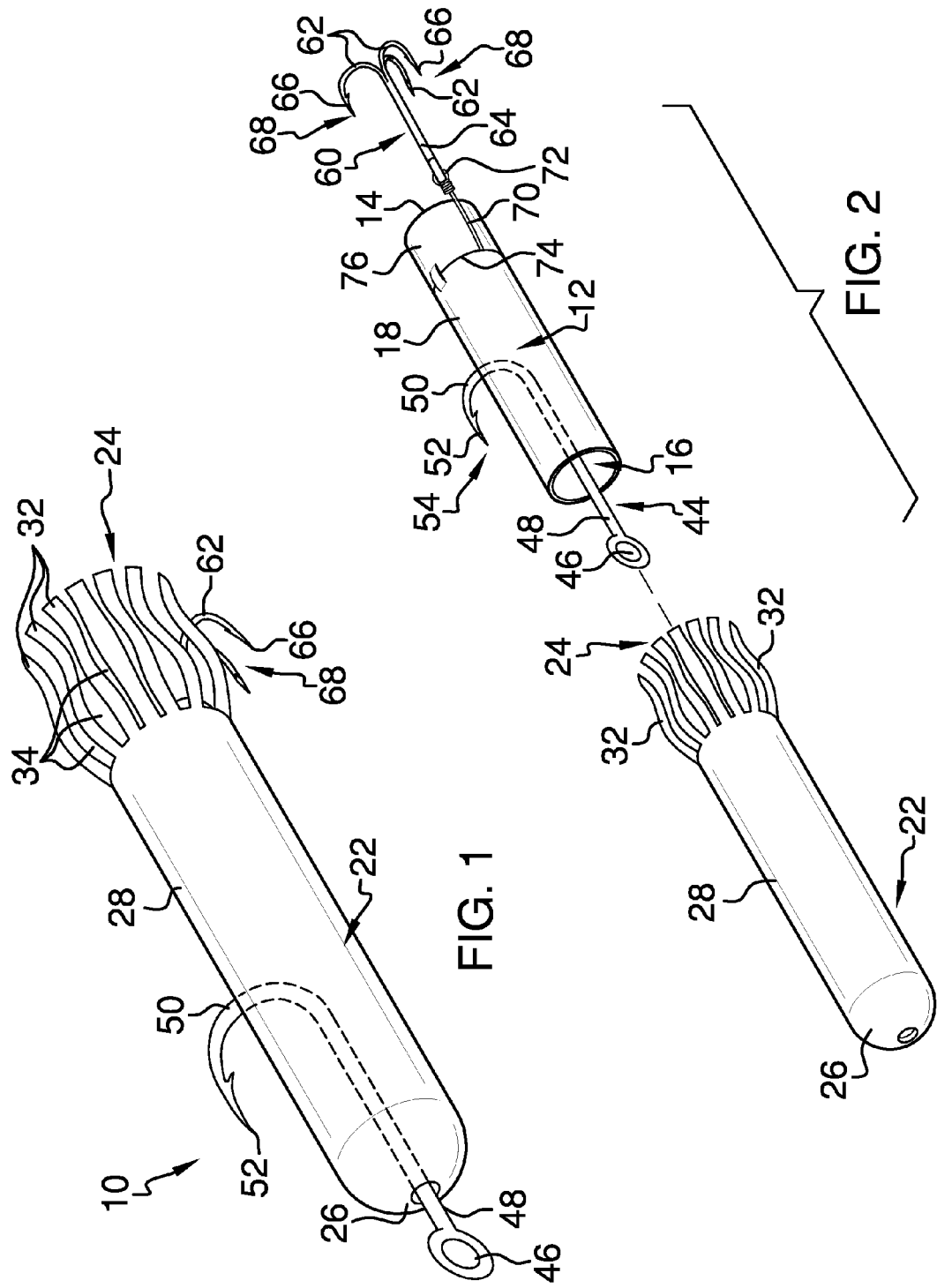

US 8,745,916 B1

FISHING LURE

CROSS-REFERENCE TO RELATED APPLICATIONS

I claim benefit of my U.S. Non-provisional Utility application Ser. No. 13/176,094 filed Jul. 5, 2011, which takes benefit from my U.S. Provisional Application No. 61/361,121 filed on Jul. 2, 2010.

BACKGROUND OF THE DISCLOSURE

Field of the Disclosure

The disclosure relates to fishing lure devices and more particularly pertains to a new fishing lure device for facilitate catching fish by providing an attractive sight, sound and smell.

SUMMARY OF THE DISCLOSURE

An embodiment of the disclosure meets the needs presented above by generally comprising an inner member having a bottom wall, an open end, and a perimeter wall extending from an outer edge of the bottom wall to the open end of the inner member. A sheath has an open end, a closed end, and a peripheral wall extending between the open end of the sheath and the closed end of the sheath. The inner member is positioned in the sheath with the bottom wall of the inner member facing the open end of the sheath. The closed end of the sheath, the perimeter wall of the inner member and the bottom wall of the inner member define an interior space. A plurality of openings is provided in the bottom wall of the inner member. A primary hook has an eye, a shank extending from the eye of the hook, a bend extending from the shank of the hook, and a point positioned at a free end of the bend of the hook. The hook is inserted through the closed end of the sheath and the open end of the inner member. The hook extends through the perimeter wall and the peripheral wall such that the point of the hook is positioned outside of the sheath. A weighted capsule is positioned in the interior space. A scent producing material is also positioned in the interior space whereby a scent is released from the interior space through the openings in the bottom wall of the inner member and the open end of the sheath.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is an isometric view of a fishing lure according to an embodiment of the disclosure.

FIG. 2 is an exploded isometric view of an embodiment of the disclosure.

DESCRIPTION OF THE PREFERRED EMBODIMENT

Figure 3:
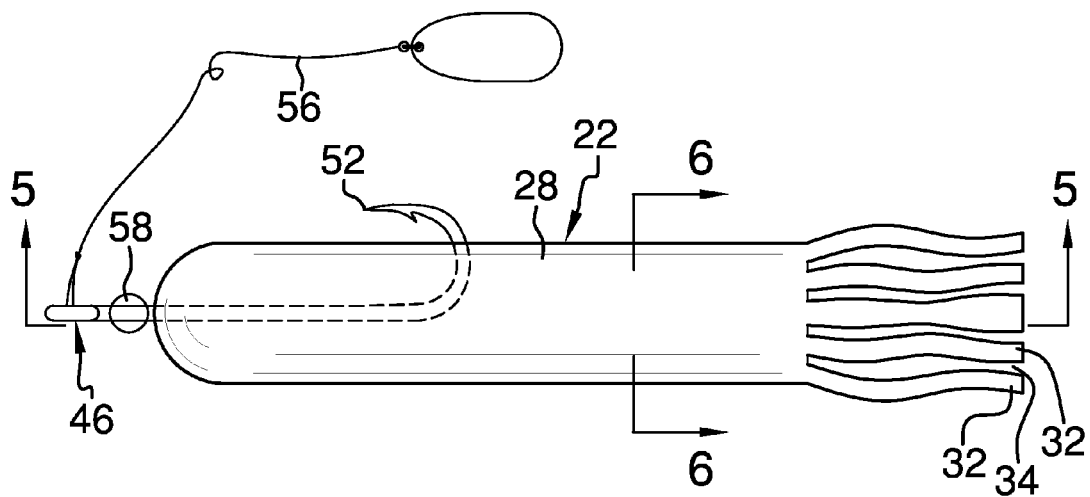
FIG. 3 is a top plan view of an embodiment of the disclosure.
Figure 4:
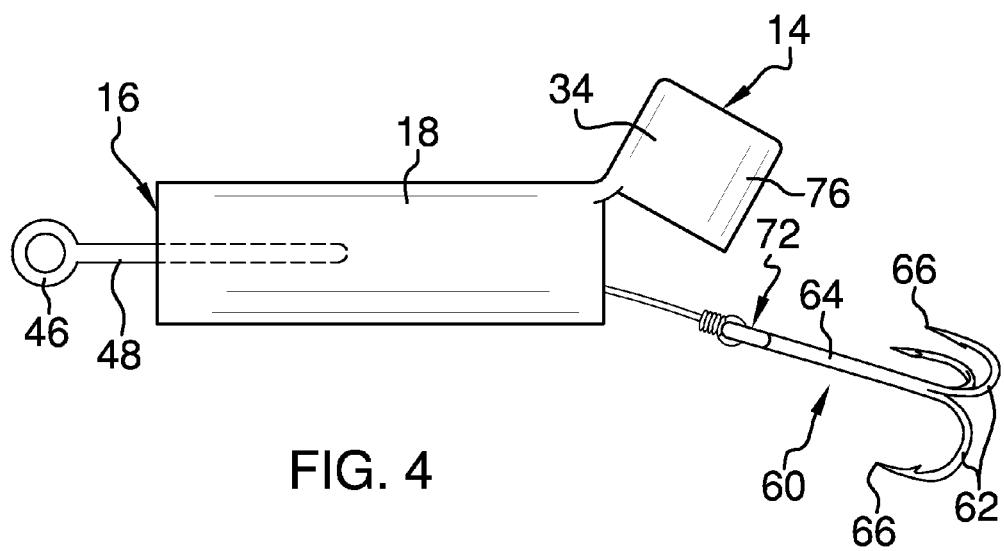
FIG. 4 is a side view of an embodiment of the disclosure.
Figure 5:
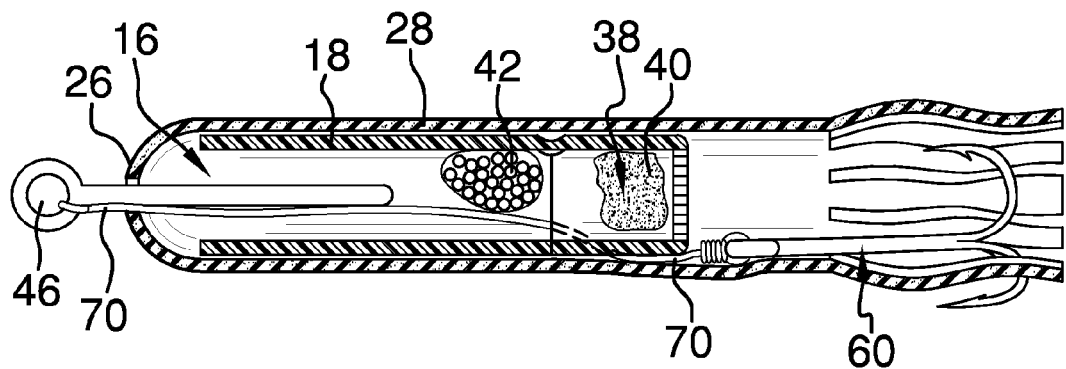
FIG. 5 is a cross-sectional view of an embodiment of the disclosure taken along line 5-5 of FIG. 3.
Figure 6:
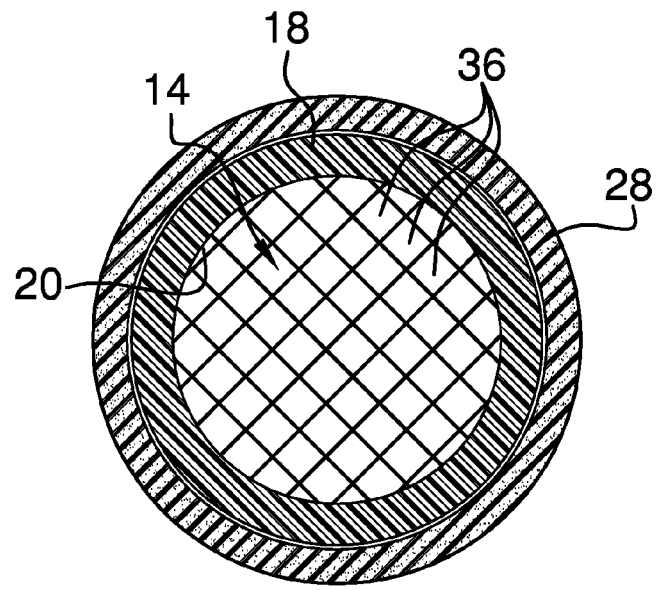
FIG. 6 is a cross-sectional view of an embodiment of the disclosure taken along line 6-6 of FIG. 3.

With reference now to the drawings, and in particular to FIGS. 1 through 6 thereof, a new fishing lure device embodying the principles and concepts of an embodiment of the disclosure and generally designated by the reference numeral 10 will be described.

As best illustrated in FIGS. 1 through 6, the fishing lure 10 generally comprises an inner member 12 having a bottom wall 14, an open end 16, and a perimeter wall 18 extending from an outer edge 20 of the bottom wall 14 to the open end 16 of the inner member 12. The inner member 12 may be constructed of a plastic material. A slit 74 may extend through the perimeter wall 18 across the inner member 12 proximate the bottom wall 14 of the inner member 12 forming a pivotable cap portion 76 of the inner member 12 extending from the bottom wall 14 of the inner member 12.

A sheath 22 has an open end 24, a closed end 26, and a peripheral wall 28 extending between the open end 24 of the sheath 22 and the closed end 26 of the sheath 22. The inner member 12 is positioned in the sheath 22. The bottom wall 14 of the inner member 12 faces the open end 24 of the sheath 22. The closed end 26 of the sheath 22, the perimeter wall 18 of the inner member 12 and the bottom wall 14 of the inner member 12 define an interior space 30. The sheath 22 may be constructed of rubber material. The sheath 22 may also have a plurality of tails 32 extending from the open end 24 of the sheath 22. The tails 32 may be integrally formed from the sheath 22 by a plurality of slits 34 extending through the peripheral wall 28 of the sheath 22.

A plurality of openings 36 are positioned in and extend through the bottom wall 14 of the inner member 12. A scent producing material 38 such as a bait pellet 40 is positioned in the interior space 30 whereby a scent is released from the interior space 30 through the openings 36 in the bottom wall 14 of the inner member 12 and the open end 24 of the sheath 22. A weighted capsule 42 may also be positioned in the interior space 30. The weighted capsule 42 may provide a rattling sound if so desired.

A primary hook 44 has an eye 46, a shank 48 extending from the eye 46 of the primary hook 44, a bend 50 extending from the shank 48 of the hook 44, and a point 52 positioned at a free end 54 of the bend 50 of the hook 44. The hook 44 is inserted through the closed end 26 of the sheath 22 and the open end 16 of the inner member 12. The hook 44 extends through the perimeter wall 18 and the peripheral wall 28 such that the point 52 of the hook 44 is positioned outside of the sheath 22.

A spinner 56 may be coupled to and extend from the eye 46 of the primary hook 44. A weight 58 may be coupled to the shank 48 of the hook 44. The weight 58 is positioned between the eye 46 of the hook 44 and the closed end 26 of the sheath 22.

A secondary hook 60 may be provided. The secondary hook 60 may have a plurality of bends 62 extending from a shank 64 of the secondary hook 60. The secondary hook 60 has a plurality of points 66. Each point 66 is positioned at a free end 68 of an associated one of the bends 62 of the secondary hook 60. A line 70 is coupled between the eye 46 of the primary hook 44 and an eye 72 of the secondary hook 60. The line 70 extends through the closed end 26 of the sheath 22 whereby the secondary hook 60 extends out of the open end 24 of the sheath 22. The assembly 10 may be used with or without the secondary hook 60.

In use, the lure 10 is attached to a fishing line. The scent producing material 38 provides a scent to entice fish to bite at the lure 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A fishing lure comprising:
    an inner member having a bottom wall, an open end, and a perimeter wall extending from an outer edge of said bottom wall to said open end of said inner member;
    a sheath, said sheath having an open end, a closed end, and a peripheral wall extending between said open end of said sheath and said closed end of said sheath, said inner member being positioned in said sheath, said bottom wall of said inner member facing said open end of said sheath, said closed end of said sheath, said perimeter wall of said inner member and said bottom wall of said inner member defining an interior space;
    a plurality of openings in said bottom wall of said inner member;
    a primary hook having an eye, a shank extending from said eye of said hook, a bend extending from said shank of said hook, and a point positioned at a free end of said bend of said hook, said hook being inserted through said closed end of said sheath and said open end of said inner member, said hook extending through said perimeter wall and said peripheral wall such that said point of said hook is positioned outside of said sheath;
    a weighted capsule positioned in said interior space; and
    a scent producing material positioned in said interior space whereby a scent is released from said interior space through said openings in said bottom wall of said inner member and said open end of said sheath.

2. The assembly of claim 1, further including a spinner coupled to and extending from said eye of said primary hook.

3. The assembly of claim 1, further including a weight coupled to said shank of said hook.

4. The assembly of claim 3, further including said weight being positioned between said eye of said hook and said closed end of said sheath.

5. The assembly of claim 1, further including said sheath having a plurality of tails extending from said open end of said sheath.

6. The assembly of claim 1, further comprising:
    a secondary hook; and
    a line coupled between said eye of said primary hook and an eye of said secondary hook, said line extending through said closed end of said sheath whereby said secondary hook extends out of said open end of said sheath.

7. The assembly of claim 6, further including said secondary hook having a plurality of bends extending from a shank of said secondary hook, said secondary hook having a plurality of points, each point being positioned at a free end of an associated one of said bends of said secondary hook.

8. The assembly of claim 1, further including a slit extending through said perimeter wall across said inner member proximate said bottom wall of said inner member forming a pivotable cap portion of said inner member extending from said bottom wall of said inner member.

9. The assembly of claim 1, further including said sheath being constructed of rubber material.

10. The assembly of claim 1, further including said inner member being constructed of plastic material.

11. A fishing lure comprising:
    an inner member having a bottom wall, an open end, and a perimeter wall extending from an outer edge of said bottom wall to said open end of said inner member, said inner member being constructed of plastic material;
    a sheath, said sheath having an open end, a closed end, and a peripheral wall extending between said open end of said sheath and said closed end of said sheath, said inner member being positioned in said sheath, said bottom wall of said inner member facing said open end of said sheath, said closed end of said sheath, said perimeter wall of said inner member and said bottom wall of said inner member defining an interior space, said sheath being constructed of rubber material, said sheath having a plurality of tails extending from said open end of said sheath;
    a plurality of openings in said bottom wall of said inner member;
    a primary hook having an eye, a shank extending from said eye of said hook, a bend extending from said shank of said hook, and a point positioned at a free end of said bend of said hook, said hook being inserted through said closed end of said sheath and said open end of said inner member, said hook extending through said perimeter wall and said peripheral wall such that said point of said hook is positioned outside of said sheath;
    a weighted capsule positioned in said interior space; and
    a scent producing material positioned in said interior space whereby a scent is released from said interior space through said openings in said bottom wall of said inner member and said open end of said sheath;
    a spinner coupled to and extending from said eye of said primary hook;
    a weight coupled to said shank of said hook, said weight being positioned between said eye of said hook and said closed end of said sheath;
    a secondary hook, said secondary hook having a plurality of bends extending from a shank of said secondary hook, said secondary hook having a plurality of points, each point being positioned at a free end of an associated one of said bends of said secondary hook;
    a line coupled between said eye of said primary hook and an eye of said secondary hook, said line extending through said closed end of said sheath whereby said secondary hook extends out of said open end of said sheath; and
    a slit extending through said perimeter wall across said inner member proximate said bottom wall of said inner member forming a pivotable cap portion of said inner member extending from said bottom wall of said inner member.

* * * * *